Patented Feb. 20, 1940

2,191,030

UNITED STATES PATENT OFFICE 2,191,030

ANTHRAQUINONE COMPOUNDS AND PROCESS FOR COLORING THEREWITH

James G. McNally and Joseph B. Dickey, Rochester, N. Y., assignors to Eastman Kodak Company, Rochester, N. Y., a corporation of New Jersey No Drawing. Application September 22, 1937, Serial No. 165,151

5 Claims. (Cl. 8—40)

This invention relates to anthraquinone compounds. More particularly it relates to amino substituted anthraquinone compounds which are suitable for the dyeing or coloration of organic derivatives of cellulose. The invention includes the new anthraquinone compounds and their preparation, the process of dyeing or coloring therewith and materials made of or containing an organic derivative of cellulose colored with said compounds.

Typical organic derivatives of cellulose include the hydrolyzed as well as the unhydrolyzed cellulose organic acid esters, such as cellulose acetate, cellulose formate, cellulose propionate or cellulose butyrate, and the hydrolized as well as the unhydrolized mixed organic acid esters of cellulose, such as cellulose acetate-proprionate, cellulose acetate-butyrate, and the cellulose ethers, such as methyl cellulose, ethyl cellulose or benzyl cellulose.

It is an object of our invention to provide a new class of anthraquinone compounds.

A further object of our invention is to provide a process for the dyeing or coloring of organic derivatives of cellulose.

A specific object is to provide a process for the dyeing or coloring of materials made of or containing an organic derivative of cellulose wherein the dye is applied directly from an aqueous suspension.

Another object is to provide material made of or containing an organic derivative of cellulose colored with the anthraquinone dye compounds of our invention.

A still further object is to provide a suitable process for the manufacture of the anthraquinone compounds of our invention.

The anthraquinone compounds, by means of which the above named objects are accomplished or made possible, have the general formula:

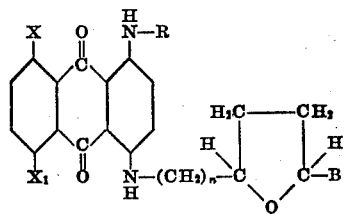

wherein $n$ represents a whole number above zero, B represents a member selected from the class consisting of hydrogen, an alkyl group and a hydroxyalkyl group, R represents a member selected from the class consisting of hydrogen, an alkyl group, a hydroxyalkyl group, an aryl group, an alkaryl group and a cycloalkyl group and X and $X_1$ each represents a member selected from the group consisting of hydrogen, a hydroxy group, an alkoxy group, an amino group, an $-\overset{H}{N}-R$ group and a

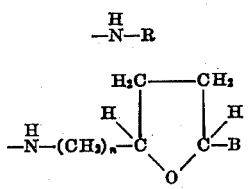

group, and in which both X and $X_1$ are not hydrogen.

The expression "and in which both X and $X_1$ are not hydrogen" appearing herein and in the claims means that both X and $X_1$ cannot be hydrogen at the same time. That is, if X is hydrogen, $X_1$ must be a substituent other than hydrogen and similarly, when $X_1$ is hydrogen, X must be a substituent other than hydrogen.

In preparing the compounds of our invention, a leuco anthraquinone compound such as leuco 1,4,5,8-tetrahydroxyanthraquinone, leuco 1,4,5-trihydroxyanthraquinone, leuco 1,4,5-triaminoanthraquinone, leuco 1,5-dihydroxy-4-methylamino anthraquinone, leuco 1,4-diamino-5-methylamino anthraquinone and leuco 1,4,5,8-tetraaminoanthraquinone, for example, is condensed with an amine having the general formula:

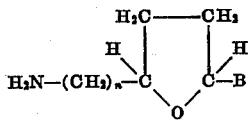

wherein $n$ represents a whole number above zero and B represents a member selected from the class consisting of hydrogen, an alkyl group and a hydroxylalkyl group. These amines, for the sake of simplicity, will be referred to herein as "furan amines."

Dye compounds of our invention can likewise be prepared by treating tri and tetra-α-substituted anthraquinones such as 1,4,5,8-tetrahydroxy anthraquinone, 1,4,5-trihydroxy anthraquinone, 1,5-diamino-4,8-dimethoxy anthraquinone, 1,4-dihydroxy, 4,8-dimethoxy anthraquinone, for example, with a furan amine or mixture of furan amines. Similarly one or more furan amines may be employed in conjunction with one or more amines other than a furan amine.

As examples of furan amines having the above general formula may be mentioned tetrahydrofurylmethylamine (tetrahydrofurfurylamine)

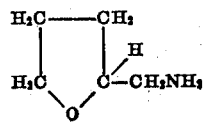

β-tetrahydrofurylethylamine

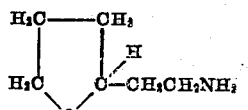

and γ-tetrahydrofurylpropylamine

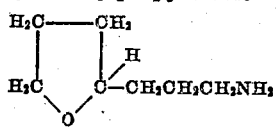

Generally speaking any leuco anthraquinone compound containing an alpha negative substituent capable of being replaced by an amino group by the action of an amine can be employed to prepare the compounds of our invention. Negative substituents capable of such replacement include, for example, the hydroxy group, the nitro group, a halogen atom such as chlorine or bromine, and an alkoxy group, such as methoxy or ethoxy. It will be understood, of course, that many alpha negative substituted anthraquinones, if employed, will not lead directly to the preparation of compounds included within the scope of our invention and in such cases further treatment is required to obtain said compounds. Advantageously, then, alpha negatively substituted anthraquinones from which the compounds of our invention may be directly prepared are employed.

Alternately, mixtures of the leuco and oxidized forms of the above described alpha negatively substituted anthraquinone compounds may be employed to prepare the compounds of our invention.

As indicated by the general formula previously given the compounds of our invention may contain the residue of amines other than "furan amines". Where this is the case, the amine residues may be attached to the anthraquinone nucleus by a single condensation or stepwise. To illustrate, where two amine residues are to be attached, condensation may be effected with both amines present or two separate condensations may be carried out, each of the two separate condensations being carried out with but one amine present, whereby condensation is effected with first one and then the other amine.

Amines, other than "furan amines" which may be employed in the preparation of the compounds of our invention include, for example, an alkylamine, such as methylamine, ethylamine, a propylamine or a butyl amine, a hydroxyalkylamine, such as ethanolamine, a propanolamine or a butanolamine, an arylamine, such as aniline, o-m-p-anisidine, o-m-p-phenetidine, o-m-p-phenylene diamine, o-m-p-toluidine, o-m-p-nitroaniline, o-m-p-chloraniline, cresidine and α- or β-naphthylamine, an alkaryl amine, such as benzylamine or phenylethylamine, and a cycloalkylamine such as cyclobutylamine and cyclohexylamine. For purposes of clarity, the term "arylamine" is intended to mean amines of the benzene and naphthalene series, in substituted or non-substituted form.

The condensation reaction can be carried out in water or in the presence of a solvent diluent such as ethanol, butanol, tetrahydrofurfuryl alcohol or pyridine. The leuco dye compounds formed by the condensation reactions may be oxidized with air or other suitable oxidizing agent, sodium perborate or hydrogen peroxide, for example, in known fashion to obtain the desired dye compounds.

For convenience, the preparation of a number of "furan amine" compounds is indicated hereinafter. Tetrahydrofurfurylamine (tetrahydrofurylmethylamine), β-tetrahydrofurylethylamine and γ-tetrahydrofurylpropylamine may be prepared by hydrogenation of furfurylamine, β-furylethylamine and γ-furylpropylamine, respectively. The hydrogenation can be carried out in accordance with the procedure described in the Journal of the American Chemical Society, vol. 55, page 2051 (1933). Furfurylamine may be prepared as described in Journal of the American Chemical Society, vol. 55, page 2051 (1933). β-furylethylamine may be prepared as described in Journal Pharm. Soc. Japan, No. 490, page 1084 (1922), while γ-furylpropylamine may be prepared as described in J. Pharm. Soc. Japan, No. 48, page 686 (1928).

The following examples illustrate the preparation of the compounds of our invention:

*Example 1*

27.2 grams of leuco-1,4,5,8-tetrahydroxyanthraquinone are added to 200 grams of butanol together with 11 grams of tetrahydrofurfurylamine and 3.5 grams of methylamine. The mixture resulting is then heated to boiling for 6 hours following which it is poured into water. The leuco dye compound formed is oxidized with sodium perborate and the desired dye compound formed thereby is recovered by filtration, washed with water and dried. The dye compound formed has the formula:

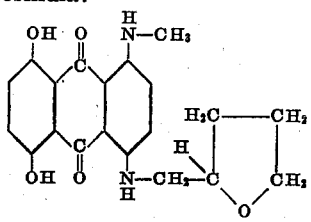

and colors cellulose acetate silk a bluish-green shade from an aqueous suspension.

*Example 2*

27.2 grams of leuco-1,4,5,8-tetrahydroxyanthraquinone are added to 250 cc. of pyridine together with 14.5 grams of 5-ω-hydroxymethyl-β-tetrahydrofurylethylamine and 7 grams of ethanolamine. The resulting mixture is heated to boiling for 6 to 8 hours following which air is passed into the heated mixture to oxidize the leuco dye compound formed. On cooling, most of the desired dye compound crystallizes out and may be recovered by filtration, and then washed and dried. The remainder of the dye compound can be recovered by concentrating the pyridine solution following which the precipitated dye compound can be recovered by filtration. The reaction product has the formula:

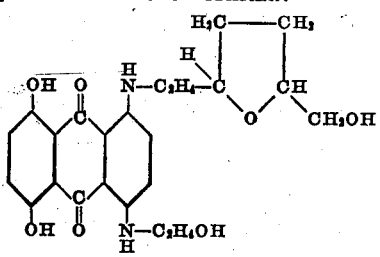

and colors cellulose acetate silk a bluish-green shade from a water suspension.

Example 3

20 grams of 1,4,5,8-tetrahydroxyanthraquinone and 7.2 grams of leuco-1,4,5,8-tetrahydroxyanthraquinone are added to 300 cc. of butanol together with 11 grams of tetrahydroxyfurfurylamine and 11 grams of cyclohexylamine. The resulting mixture is then heated to boiling until reaction is complete following which it is poured into water and the leuco dye compound formed oxidized by adding sodium perborate. The dye compound formed is recovered by filtration, washed with water and dried. It has the formula:

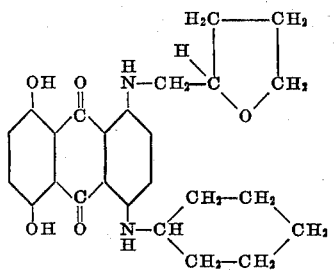

and colors cellulose acetate silk a bluish-green shade from an aqueous suspension.

Example 4

27.2 grams of leuco-1,4,5,8-tetrahydroxyanthraquinone are added to 300 cc. of butanol together with 13.5 grams of γ-tetrahydrofurylpropylamine and 12 grams of p-phenylenediamine. The resulting mixture is heated to boiling for 20 hours following which it is poured into water and the leuco dye compound formed oxidized by adding sodium perborate. The dye compound resulting is recovered by filtration, washed with water and dried. It has the formula:

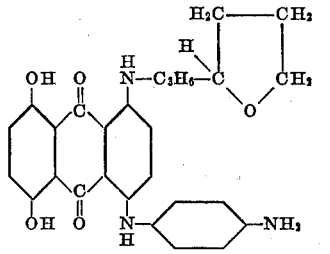

and colors cellulose acetate silk a bluish-green shade from an aqueous suspension.

Example 5

27.2 grams of leuco-1,4,5,8-tetrahydroxyanthraquinone are added to 300 cc. of butanol together with 11 grams of tetrahydrofurfurylamine and 16 grams of p-aminomethylethylaniline. The mixture resulting is heated at 100° C. for 24 hours following which the reaction mixture is poured into water and the leuco dye compound formed oxidized by adding sodium perborate. The desired dye compound is recovered by filtration, washed with water and dried. The dye compound formed has the formula:

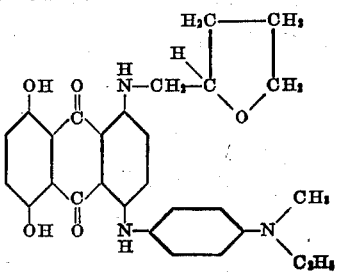

and colors cellulose acetate silk bluish-green from a water suspension.

p-Aminomethylglycerylaniline and p-amino-β-hydroxyethylcyclohexylamine, for example, may be substituted for the p-aminomethylethylaniline of the example to obtain generally similar compounds.

Example 6

25.3 grams of leuco-1,4,5-triaminoanthraquinone are treated in 150 cc. of butanol with a mixture of 11 grams of tetrahydrofurfurylamine and 9 grams of propanolamine at the boiling point of butanol for 6 hours. The reaction mixture is poured into water and the leuco dye compound formed is oxidized by adding sodium perborate. The desired dye is recovered by filtration, washed with water and dried. It has the formula:

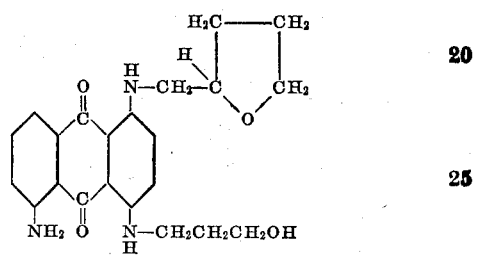

and colors cellulose acetate silk blue-green from a water suspension.

Example 7

26.8 grams of leuco-1,4,5,8-tetraaminoanthraquinone are treated in 300 cc. of butanol with 20 grams of tetrahydrofurfurylamine and 10 grams of ethylamine at the boiling point of butanol for 6 hours. The reaction mixture may be worked up as described in Example 6 to obtain a dye compound having the formula:

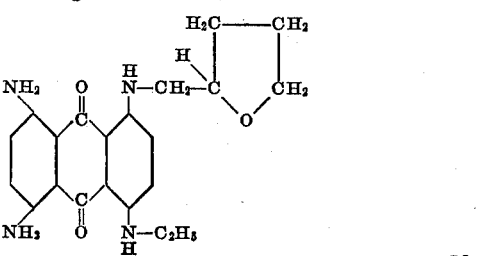

which colors cellulose acetate silk a bluish-green shade from an aqueous suspension.

Example 8

26.7 grams of leuco-1,4,5-trihydroxy-8-aminoanthraquinone are added to 400 cc. of butanol together with 12 grams of tetrahydroxyfurfurylamine and 4 grams of methylamine and the resulting mixture is heated to boiling for 6 hours. The desired reaction product may be recovered by working up the reaction mixture as described in Example 6. The dye compound thus obtained has the formula:

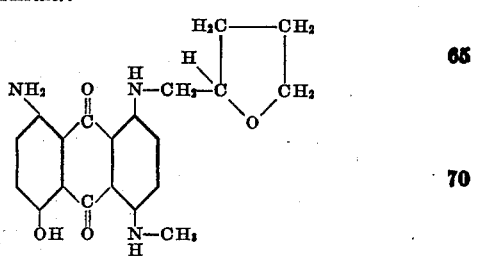

and dyes cellulose acetate silk a bluish-green shade from an aqueous suspension.

Example 9

27 grams of leuco-1,4,5,8-tetrahydroxyanthraquinone, 32 grams of p-hydroxyethanolamine, 25 grams of tetrahydrofurfurylamine and 150 grams of water are heated together in a pressure vessel at 110–130° C. for 10 hours. The resulting mixture may be worked up as described in Example 6 to obtain the desired dye compound. The dye compound thus obtained has the probable formula:

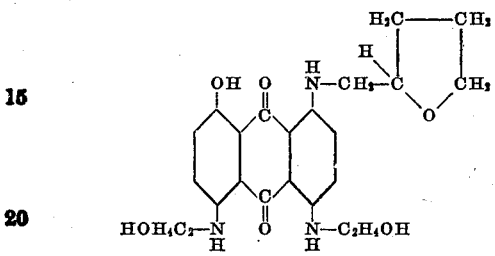

and dyes cellulose acetate silk a bluish-green shade from a water suspension.

Example 10

27 grams of leuco-1,4,5,8-tetrahydroxyanthraquinone, 2.5 grams of sodium hydrosulfite, 150 cc. of water, 25 grams of tetrahydrofurfurylamine and 24 grams of methylamine (as a 30% water solution) are added together in a pressure vessel at 110–130° C. for 10 hours. The leuco dye compound formed by the reaction is oxidized with sodium perborate and the desired dye compound thereby formed is recovered by filtration, washed with water and dried. The dye compound has the formula:

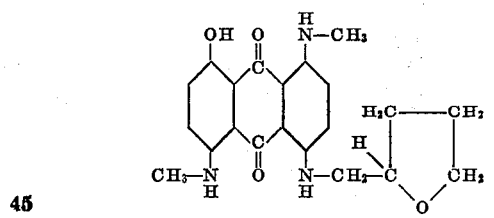

and colors cellulose acetate silk a bluish-green shade from an aqueous suspension.

Example 11

27 grams of leuco-1,4,5,8-tetrahydroxyanthraquinone, 2.5 grams of sodium hydrosulfite, 150 cc. of water, 50 grams of tetrahydrofurfurylamine and 12 grams of methylamine (in the form of a 30% water solution) are heated together in an autoclave at 110–130° C. for 10 hours. The leuco dye compound formed is oxidized by the addition of sodium perborate and the desired dye compound formed thereby is recovered by filtration, washed with water and dried. The dye has the probable formula:

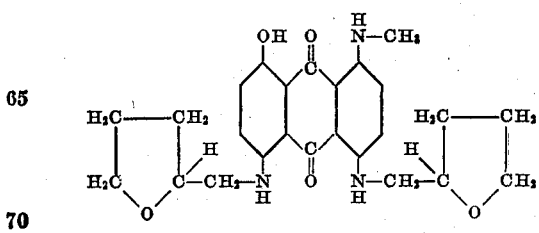

and colors cellulose acetate silk a bluish-green shade from a water suspension.

In order that the application of the compounds of our invention may be clearly understood, their application for the direct dyeing or coloration of materials made of or containing an organic derivative of cellulose, and more particularly cellulose acetate silk, is described hereinafter.

In employing the anthraquinone compounds of our invention as dyes, they will ordinarily be applied to the material in the form of an aqueous suspension which can be prepared by grinding the dye to a paste in the presence of a sulfonated oil, soap or other suitable dispersing agent and dispersing the resulting paste in water. Dyeing operations can, with advantage, be conducted at a temperature of 80–85° C., but any suitable temperature may be used. In accordance with the usual dyeing practice, the material to be dyed will ordinarily be added to the aqueous dye bath at a temperature lower than that at which the main portion of the dyeing is to be effected, a temperature approximating 45–55° C., for example, following which the temperature of the dyebath will be raised to that selected for carrying out the dyeing operation. The temperature at which the dyeing is conducted will vary somewhat, depending, for example, on the particular material or materials undergoing coloration.

The amount of dispersing agent employed may be varied over wide limits. Amounts approximating 10 to 200% by weight on the dye may be employed, for example. These amounts are not to be taken as limits as greater or lesser amounts can be used. To illustrate, if the dye is ground to a sufficiently fine powder, dyeing can be satisfactorily carried out without the aid of a dispersing agent. Generally speaking, however, the use of a dispersing agent is desirable.

It will be understood that the anthraquinone compounds of our invention may be applied to the material to be colored in any suitable manner. Coloration may be effected, for example, by dyeing, printing, or stenciling. Dispersing or solubilizing agents that can be employed for preparing suspensions of the dye include soap, sulphoricinoleic acid, salts of sulphoricinoleic acid, a water soluble salt of cellulose phthalate, cellulose succinate or cellulose mono-acetate diphthalate, for example, the sodium, potassium or ammonium salts, and sulfonated oleic, stearic or palmitic acid, or salts thereof, such, for example, as the sodium or ammonium salts.

The following examples illustrate how dyeing may be carried out in accordance with our invention. Quantities are expressed in parts by weight.

Example A 2 parts of

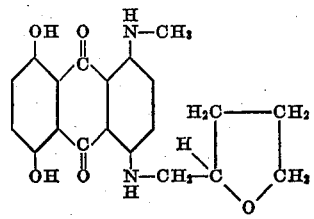

are finely ground with a dispersing agent such as soap or oleyl glyceryl sulfate and the resulting paste is dispersed in 1000 parts of water. The dispersion thus prepared is heated to a temperature approximating 45–55° C. and 100 parts of cellulose acetate silk, in the form of yarn or fabric, for example, are added to the dyebath after which the temperature is gradually raised to 80–85° C. and the silk worked for several hours at this latter temperature. Sodium chloride may be added as desired during the dyeing operation to promote exhaustion of the dyebath. Upon completion of the dyeing operation, the cellulose acetate silk is removed, washed with soap, rinsed and dried. The cellulose acetate silk is colored a bluish-green shade of good fastness to light.

*Example B*

2 parts of

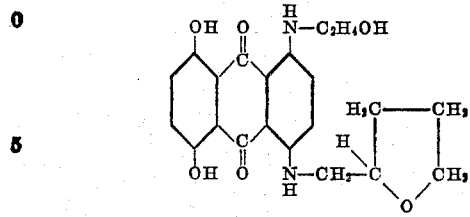

are finely ground with a dispersing agent such as soap or oleyl glyceryl sulfate and the resulting paste is dispersed in 1000 parts of water. The dispersion thus prepared is heated to a temperature approximating 45–55° C. and 100 parts of cellulose acetate silk, in the form of yarn or fabric, for example, are added to the dyebath after which the temperature is gradually raised to 80–85° C. and the silk worked for several hours at this latter temperature. Sodium chloride may be added as desired during the dyeing operation to promote exhaustion of the dyebath. Upon completion of the dyeing operation, the cellulose acetate silk is removed, washed with soap, rinsed and dried. The cellulose acetate silk is colored a bluish-green shade of good fastness to light.

While our invention has been illustrated in connection with the dyeing of cellulose acetate silk, it will be understood that dyeing operations can be carried out in a manner similar to that described above by the substitution of another organic derivative of cellulose material for cellulose acetate silk or by employing dye compounds other than those employed in the example, or by substitution of both the material being dyed and the dye compounds of the examples.

What is claimed is:

1. As new products anthraquinone compounds having the general formula:

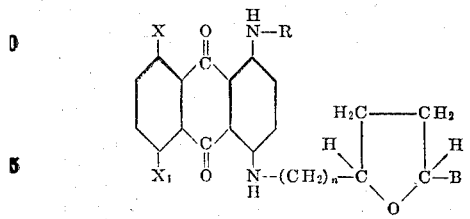

wherein $n$ represents a small whole number above zero, B represents a member selected from the class consisting of hydrogen, an alkyl group and a hydroxyalkyl group, R represents a member selected from the class consisting of hydrogen, an alkyl group, a hydroxyalkyl group, an aryl group, an alkaryl group and a cycloalkyl group and X and $X_1$ each represents a member selected from the class consisting of hydrogen, a hydroxy group, an alkoxy group, an amino group, an

group, wherein R has the meaning above given,

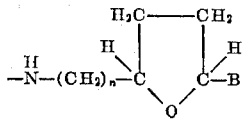

and a group, wherein $n$ and B have the meaning previously assigned them, and in which both X and $X_1$ are not hydrogen.

2. The anthraquinone compound having the formula:

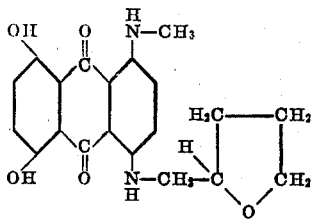

3. The anthraquinone compound having the formula:

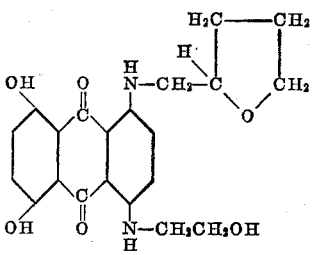

4. The process of coloring material made of or containing an organic derivative of cellulose which comprises applying thereto a nuclear non-sulfonated dye, having affinity for organic derivatives of cellulose, selected from the class of anthraquinone compounds having the general formula:

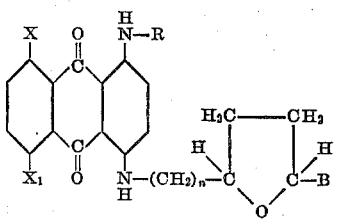

wherein $n$ represents a small whole number above zero, B represents a member selected from the class consisting of hydrogen, an alkyl group and a hydroxyalkyl group, R represents a member selected from the class consisting of hydrogen, an alkyl group, a hydroxyalkyl group, an aryl group, an alkaryl group and a cycloalkyl group and X and $X_1$ each represents a member selected from the class consisting of hydrogen, a hydroxy group, an alkoxy group, an amino group, an

group, wherein R has the meaning above given, and a

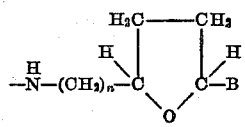

group, wherein $n$ and B have the meaning previously assigned them, and in which both X and $X_1$ are not hydrogen.

5. The process of coloring material made of or containing a cellulose acetate which comprises applying thereto a nuclear non-sulfonated dye, having affinity for cellulose acetate, selected from the class of anthraquinone compounds having the general formula:

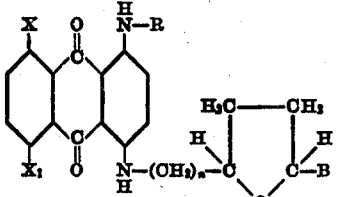

wherein $n$ represents a small whole number above zero, B represents a member selected from the class consisting of hydrogen, an alkyl group and a hydroxyalkyl group, R represents a member selected from the class consisting of hydrogen, an alkyl group, a hydroxyalkyl group, an aryl group, an alkaryl group and a cycloalkyl group and X and $X_1$ each represents a member selected from the class consisting of hydrogen, a hydroxy group, a alkoxy group, an amino group, an

group, wherein R has the meaning above given, and a

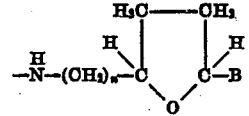

group, wherein $n$ and B have the meaning previously assigned them, and in which both X and $X_1$ are not hydrogen.

JOSEPH B. DICKEY.
JAMES G. McNALLY.